United States Patent
Kugo et al.

(10) Patent No.: US 9,248,519 B2
(45) Date of Patent: Feb. 2, 2016

(54) GEAR MACHINING APPARATUS AND GEAR MACHINING CONDITION SETTING DEVICE

(75) Inventors: Junshi Kugo, Hirakata (JP); Ryou Yamaguchi, Hirakata (JP); Eiji Nabata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 475 days.

(21) Appl. No.: 13/818,751

(22) PCT Filed: Mar. 21, 2012

(86) PCT No.: PCT/JP2012/057118
§ 371 (c)(1),
(2), (4) Date: Feb. 25, 2013

(87) PCT Pub. No.: WO2012/133025
PCT Pub. Date: Oct. 4, 2012

(65) Prior Publication Data
US 2013/0156521 A1    Jun. 20, 2013

(30) Foreign Application Priority Data
Mar. 31, 2011   (JP) .................................. 2011-080697

(51) Int. Cl.
*B23F 23/12* (2006.01)
*B23F 5/22* (2006.01)
(52) U.S. Cl.
CPC . *B23F 23/12* (2013.01); *B23F 5/22* (2013.01); *Y10T 409/100159* (2015.01)
(58) Field of Classification Search
USPC ................ 700/189; 409/2; 219/69.13; 45/15
See application file for complete search history.

(56) References Cited

U.S. PATENT DOCUMENTS

| | | | |
|---|---|---|---|
| 5,742,018 A | * | 4/1998 | Akemura .................... 219/69.13 |
| 2004/0263099 A1 | * | 12/2004 | Maslov et al. ................ 318/254 |
| 2012/0156963 A1 | * | 6/2012 | Vogler et al. ....................... 451/5 |

FOREIGN PATENT DOCUMENTS

| JP | 63-127814 A | 5/1988 |
|---|---|---|
| JP | 11-309622 A | 11/1999 |
| JP | 2001-087945 A | 4/2001 |
| JP | 2008-213097 A | 9/2008 |

OTHER PUBLICATIONS

International Search Report for PCT/JP2012/057118, 2012.

* cited by examiner

*Primary Examiner* — Kidest Bahta
(74) *Attorney, Agent, or Firm* — Global IP Counselors, LLP

(57) ABSTRACT

A gear machining condition setting device receives a feeding amount determining parameter and a cutting speed determining parameter. A storage unit stores a cutting-in amount calculation formula representing a relation between a cutting-in amount and a characteristic value determined based on a feeding amount and the feeding amount determining parameter. The feeding amount of the hob, corresponding to the cutting-in amount, is computed using the cutting-in amount calculation formula. Further, the storage unit stores data of a constant temperature curve representing a relation between the cutting-in amount and the cutting speed where a cutting edge of the hob is set at a predetermined temperature. Using the data, the cutting speed is computed based on the cutting-in amount and the cutting speed determining parameter with reference to the constant temperature curve.

8 Claims, 4 Drawing Sheets

GEAR MACHINING APPARATUS AND GEAR MACHINING CONDITION SETTING DEVICE

CROSS-REFERENCE TO RELATED APPLICATIONS

This application claims priority to Japanese Patent Application No. 2011-080697 filed on Mar. 31, 2011, the disclosure of which is hereby incorporated herein by reference in its entirety.

TECHNICAL FIELD

The present invention relates to a gear machining condition setting device, and particularly to a gear machining condition setting device for outputting a machining condition in cutting a gear workpiece with a hob and a gear machining apparatus equipped with the same.

BACKGROUND ART

A hobber has been produced as an exemplary gear machining apparatus. The hobber is an apparatus for cutting a tooth profile with an involute curve on a workpiece using a hob. In the hobber, the workpiece is supported by a table while the hob is supported by a tool head. The hob and the workpiece are rotated at a constant relation by their corresponding drive mechanisms. Further, the hob is configured to be fed relatively to the workpiece along a gear shaft direction of the workpiece at a constant feeding amount by means of a feeder mechanism.

In a work machine including a bobber as described above, it has been demanded to set a cutting speed to be suitable for respective conditions in order to enhance a machining efficiency. For example, Japan Laid-open Patent Application Publication No. JP-A-2008-213097 describes a method of obtaining a cutting speed based on a hardness of a workpiece material. On the other hand, Japan Laid-open Patent Application Publication No. JP-A-2001-87945 describes a relation between a gear module and a cutting speed in a hobber (e.g., FIG. 17).

SUMMARY

The method described in Japan Laid-open Patent Application Publication No. JP-A-2008-213097 is a cutting speed calculating method for setting a cutting edge temperature to be 640 to 700 degrees Celsius, wherein a workpiece material is limited to either pure iron or carbon steel used for mechanical structure, Vickers hardness of which is greater than or equal to 100 and less than or equal to 170. Therefore, the method cannot be applied to setting of general gear machining conditions.

When gear teeth machining is herein executed by a hobber, the machining time is directly affected by the feeding amount per cutting blade of a hob as well as the cutting speed. However, as described in Japan Laid-open Patent Application Publication No. JP-A-2001-87945, in a conventional machining condition setting method, the cutting speed is configured to be simply determined by a gear module, and the same is true of the feeding amount. Further, these settings are not provided with clear criteria, and are actually set on an empirical basis at a level to prevent, at best, deficiency or abnormal abrasion in a cutting blade of the hob. Yet further, even when appropriate machining conditions can be set on an empirical basis, it is required to find out new machining conditions through a machining test and etc. when specifications of the hob and the gear are changed.

It is an object of the present invention to easily obtain a preferred machining condition for a specification of a hob, a specification of a gear workpiece and etc. through the input of the specifications and etc.

A gear machining condition setting device according to a first aspect is a device for outputting a machining condition in cutting a gear workpiece using a hob, and includes a parameter receiving unit, a first storage unit, a second storage unit, a feeding amount computing unit, a third storage unit and a cutting speed computing unit. The parameter receiving unit is configured to receive: a feeding amount determining parameter containing a specification of the hob and a specification of the gear workpiece; and a cutting speed determining parameter containing a target temperature during machining of a cutting edge of the hob. The first storage unit is configured to store a cutting-in amount calculation formula representing a relation between: a characteristic value determined by the feeding amount determining parameter and a relative feeding amount of the hob with respect to the gear workpiece; and a computed cutting-in amount per a cutting blade of the hob. The second storage unit is configured to store a cutting-in amount upper limit per a cutting blade of the hob preliminarily set by the specification and a material of the gear workpiece. The feeding amount computing unit is configured to compute a feeding amount of the hob using the cutting-in amount calculation formula based on a preliminarily set cutting-in amount per a cutting blade of the hob including the cutting-in amount upper limit. The third storage unit is configured to store data of a constant temperature curve representing a relation between the cutting-in amount and the cutting speed where a temperature of the cutting edge of the hob is set to be a predetermined temperature. The cutting speed computing unit is configured to compute the cutting speed based on the cutting-in amount corresponding to the feeding amount and the cutting speed determining parameter with reference to the constant temperature curve.

In the device, the parameters for determining the feeding amount and the cutting speed are inputted by an operator or etc. The feeding amount determining parameter contains the specifications of the hob and the gear workpiece. The cutting speed determining parameter contains the target temperature during machining of the cutting edge of the hob. When these parameters are inputted, the feeding amount is computed using the cutting-in amount calculation formula based on the preliminarily set cutting-in amount per a cutting blade of the hob. Next, the cutting speed is computed using the constant temperature curve based on the cutting-in amount corresponding to the computed feeding amount and the cutting speed determining parameter. The constant temperature curve is a curve representing the relation between the cutting-in amount and the cutting speed where the temperature of the cutting edge of the hob is set to be a predetermined temperature.

Here, it is possible to easily obtain a preferred feeding amount and a preferred cutting speed by inputting specifications of the hob and the gear workpiece and etc. Therefore, machining can be constantly executed by setting a preferred feeding amount and a preferred cutting speed even when the specifications of the hob and the gear are changed.

A gear machining condition setting device according to a second aspect relates to the device of the first aspect, and wherein the feeding amount determining parameter contains a relative specified feeding amount of the hob with respect to the gear workpiece, and the feeding amount computing unit is configured to compute the feeding amount based on a cutting-in amount obtained with reference to the cutting-in amount upper limit and the computed cutting-in amount obtained using the cutting-in amount calculation formula based on the specified feeding amount.

Now, the feeding amount may be specified by an operator in consideration of the surface roughness. The computed cutting-in amount is calculated using the cutting-in amount calculation formula based on the specified feeding amount, and further, the feeding amount is calculated based on the computed cutting-in amount and the cutting-in amount upper limit.

Here, the feeding amount is determined in consideration of the surface roughness and the cutting-in amount upper limit. Therefore, it is possible to easily determine a machining condition in consideration of the quality of machining and the life of the hob.

A gear machining condition setting device according to a third aspect relates to the device of the second aspect, and wherein the feeding amount computing unit is configured to select a smaller one of the computed cutting-in amount and the cutting-in amount upper limit as the cutting-in amount.

Here, similarly to the second aspect, it is possible to easily determine a predetermined machining condition in consideration of the quality of machining and the life of the hob.

A gear machining condition setting device according to a fourth aspect relates to the device of any of the first to third aspects, and wherein the characteristic value contained in the cutting-in amount calculation formula is a value that is proportional to a module of the gear workpiece, the feeding amount of the hob with respect to the gear workpiece and a power of the number of threads of the hob, and is inversely proportional to the number of gear teeth of the gear workpiece and the number of grooves of the hob.

A gear machining condition setting device according to a fifth aspect relates to the device of any of the first to fourth aspects, and wherein the constant temperature curve is generated based on a relation that the cutting-in amount and the cutting speed are inversely proportional where the temperature of the cutting edge of the hob is constant.

A gear machining condition setting device according to a sixth aspect relates to the device of any of the first to fifth aspects, and wherein the cutting speed computing unit is configured to compute a main shaft rotational speed based on the cutting speed.

A gear machining condition setting device according to a seventh aspect relates to the device of the sixth aspect, and further includes a fourth storage unit configured to store an allowable output of a main shaft motor and a main shaft rotational speed limit computing unit. The main shaft rotational speed limit computing unit is configured to compute a main shaft rotational speed upper limit based on the allowable output and a cutting power. The cutting power is computed based on the specifications of the hob and the gear workpiece, the main shaft rotational speed and the feeding amount of the hob with respect to the gear workpiece. Further, the cutting speed computing unit is configured to compare the main shaft rotational speed upper limit and the main shaft rotational speed obtained by the computation and output a smaller one of the rotational speeds as a main shaft rotational speed for a control purpose.

Here, the cutting power is firstly computed based on the specifications of the hob and the gear workpiece, the main shaft rotational speed and the feeding amount, and then, the main shaft rotational speed upper limit is computed based on the cutting power and the allowable output. Subsequently, the main shaft rotational speed obtained in the sixth aspect and the main shaft rotational speed upper limit are compared, and a smaller one of the rotational speeds is outputted as a main shaft rotational speed for a control purpose.

A gear machining device according to an eighth aspect is a device for cutting gear teeth with an involute curve, and includes: a main shaft that a hob is attached to a tip thereof; a feeding unit for moving the main shaft along an axial direction of a gear workpiece; a numerical control unit configured to set a processing condition including a feeding amount of the feeding unit and a rotational speed of the main shaft and control machining; and the gear machining condition setting device recited in any of the first to seventh aspects configured to transmit a set value of the feeding amount and a set value of the main shaft rotational speed to the numerical control unit.

According to the aspects as described above, it is possible to easily obtain a preferred feeding amount and a preferred cutting speed by inputting a specification of a hob, a specification of a gear workpiece and etc., and thereby, it is possible to execute efficient machining based on appropriate machining conditions.

DESCRIPTION OF THE EMBODIMENTS

Gear Teeth Cutting by Hob

Figure 1:
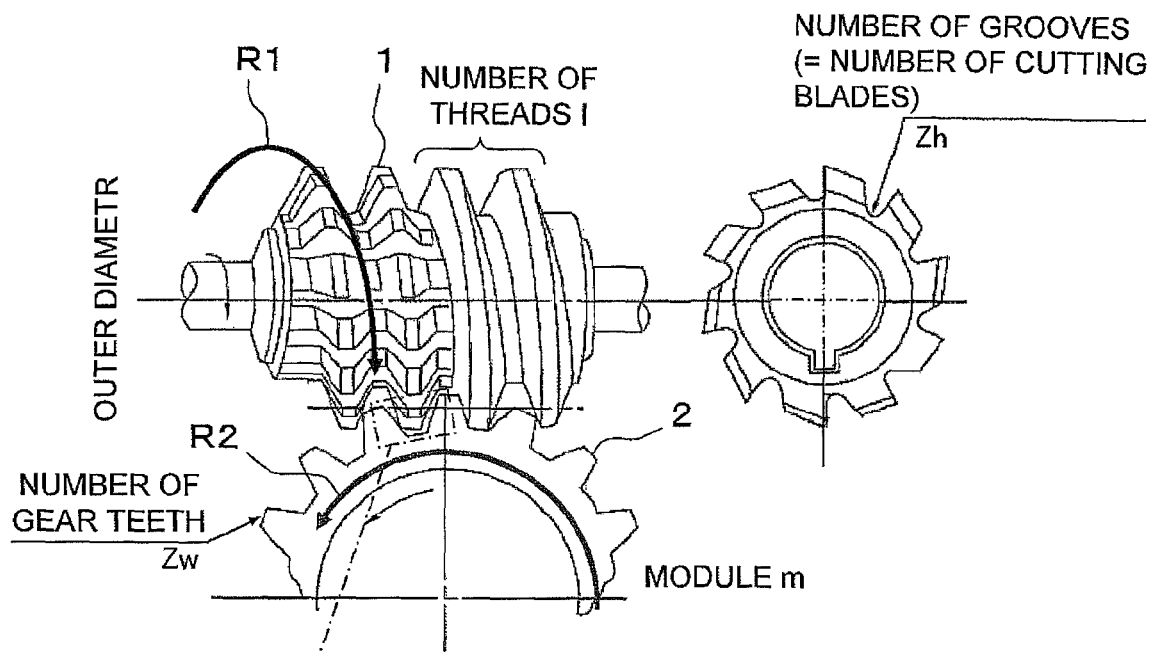
FIG. 1 is a schematic diagram for explaining gear teeth cutting by a hob.

First, an overview of gear teeth cutting by a hob will be explained with reference to FIG. 1. In FIG. 1, a hob 1 is rotated in an R1 direction of FIG. 1 while being attached to a main shaft of a hobber (a gear machining device). On the other hand, a gear blank 2 as a workpiece (hereinafter simply referred to as "a gear workpiece") is rotated in an R2 direction of FIG. 1 while being supported by a table of the bobber. Thus, gear teeth cutting is executed while the hob 1 and the gear workpiece 2 are rotated relatively to each other in a predetermined relation. Further, the hob 1 is configured to be fed in a gear axial direction (a direction arranged perpendicularly to the diagram of FIG. 1) at a predetermined amount per rotation of the gear workpiece 2. The predetermined feeding amount in the gear axial direction of the case will be hereinafter referred to as "a feeding amount".

In the following explanation, the specification of the hob 1 contains the number of threads I and the number of grooves (the number of cutting blades) Zh, whereas the specification of the gear workpiece 2 contains a module m and the number of gear teeth Zw. Further, the cutting speed V (corresponding to the rotational speed of the main shaft to which the hob is attached) and the feeding amount f of the hob 1 are set as machining conditions. Yet further, as illustrated in FIG. 1, the cutting-in amount per cutting blade of the hob 1 is set as ap.

Overall Structure

Figure 2:
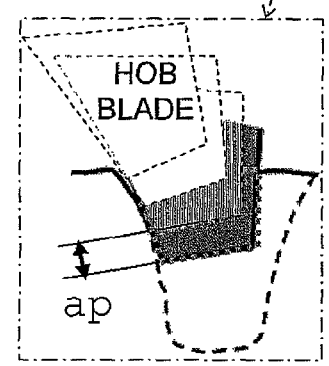
FIG. 2 is an entire block diagram of a hobber according to an exemplary embodiment of the present invention.
Figure 2:
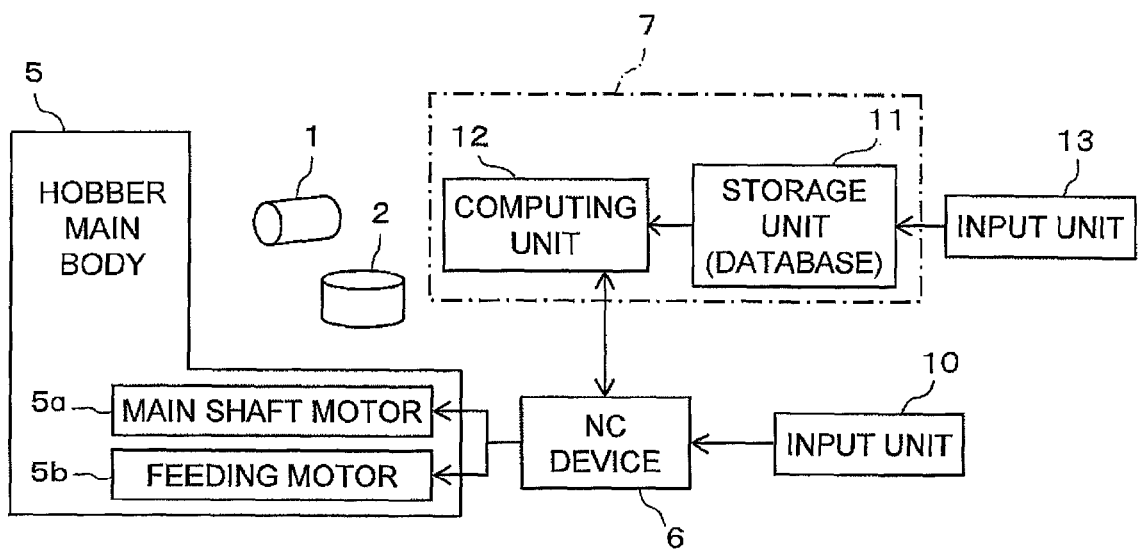

FIG. 2 represents an entire block diagram of the hobber according to an exemplary embodiment of the present invention. The hobber includes a hobber main body 5, a numerical control device (NC device) 6 for controlling machining by the hobber main body 5 and a machining condition computing device 7 for giving the numerical control device 6 instructions on the feeding amount f of the hob 1 and the cutting speed V (main shaft rotational speed). The hob 1 is supported by the main shaft of the hobber main body 5, whereas the workpiece 2 is supported by the table.

The hobber main body 5 is provided with a main shaft motor 5a and a feeding motor 5b. The main shaft motor 5a is a motor for driving and rotating the main shaft to which the hob 1 is mounted. On the other hand, the feeding motor 5b is a motor for moving the main shaft to which the hob 1 is mounted in the gear axial direction of the gear workpiece 2.

The numerical control device 6 is provided with a storage device (not illustrated in the figures) storing therein a machining program and an input unit 10 for setting a machining condition. Specifications of the hob 1 and the gear workpiece 2 and machining conditions such as the specified feeding amount are inputted as input parameters through the input unit 10.

The machining condition computing device 7 includes a storage unit 11 and an computing unit 12. A target temperature of the cutting edge of the hob, an allowable output of the main shaft motor 5a and etc. are inputted as threshold values for a control purpose into the machining condition computing device 7 through an input unit 13. The storage unit 11 stores a variety of databases and a cutting power calculation formula. The databases will be described below. Further, the cutting power calculation formula is an arithmetic expression for calculating cutting power based on specifications of the hob and the gear workpiece, the main shaft rotational speed and the feeding amount. The computing unit 12 has a parameter receiving function, a machining condition computing function and a condition outputting function. The parameter receiving function is a function of importing/retrieving a parameter (e.g., a threshold) to be inputted from the input unit 13 and a parameter to be given by the numerical control device 6. Further, the machining condition computing function is a function of computing a preferred machining condition in executing gear teeth cutting by the bobber main body 5, i.e., a preferred feeding amount f (mm/t-rev) and a preferred cutting speed V (the main shaft rotational speed: m/min) with respect to the gear workpiece 2 of the hob 1 with reference to the database stored in the storage unit 11. The condition outputting function is a function of outputting the feeding amount obtained through computation to the numerical control device 6; and outputting the main shaft rotational speed for a control purpose, which corresponds to the cutting speed, to the numerical control device 6.

The numerical control device 6 transmits a current command value to the main shaft motor 5a and the feeding motor 5b based on a signal from the machining condition computing device 7. Accordingly, the hob 1 is fed at a feeding amount suitable for the respective conditions while being rotated at a rotational speed suitable for the respective conditions.

Database of Storage Unit

As described above, the storage unit 11 stores parameters (e.g., threshold values for a control purpose) inputted from the input unit 13 in order to compute a machining condition, and also stores a variety of database as described below.

First Database

Figure 3:
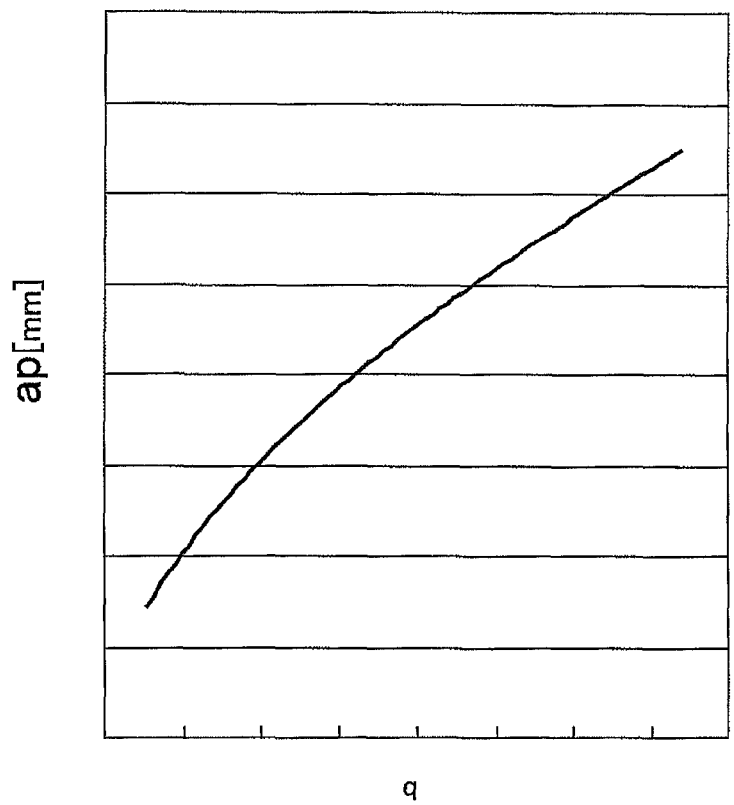
FIG. 3 is a chart representing a relation between a characteristic value q and a cutting-in amount.

A first database DB1 is data for representing a computed cutting-in amount ap1 with respect to a given characteristic value q. Inventors of the present invention examined specifications and etc. of the hob 1 and the gear workpiece 2 and the cutting-in amount from a variety of perspectives. As a result, it was found as represented in FIG. 3 that, where the characteristic value q is defined, a certain relation is established between the characteristic value q and the cutting-in amount ap, and the cutting-in amount ap is expressed with the following approximation formula.

$$ap = \beta \times q^{\gamma} \qquad (1)$$

It should be noted that the characteristic value q is a value defined by the module m of the gear workpiece 2, the feeding amount f (mm/t-rev) of the hob 1 with respect to the gear workpiece 2, the number of threads I of the hob 1, the number of gear teeth Zw of the gear workpiece 2 and the number of grooves Zh of the hob 1, and is expressed by the following formula.

$$q = m \times f \times I^{\alpha}/(Zw \times Zh) \qquad (2)$$

In short, the characteristic value q is a value that is proportional to the module m, the feeding amount f and a power of the number of threads I while being inversely proportional to the number of gear teeth Zw and the number of grooves Zh.

Therefore, the storage unit 11 stores the approximation formula (1) for computing the cutting-in amount ap1 and the formula (2) for representing the relation between the characteristic value q and the feeding amount f as the first database DB1. A cutting-in amount to be obtained by the approximation formula (1) will be hereinafter described as "the computed cutting-in amount ap1".

Second Database

Figure 4:
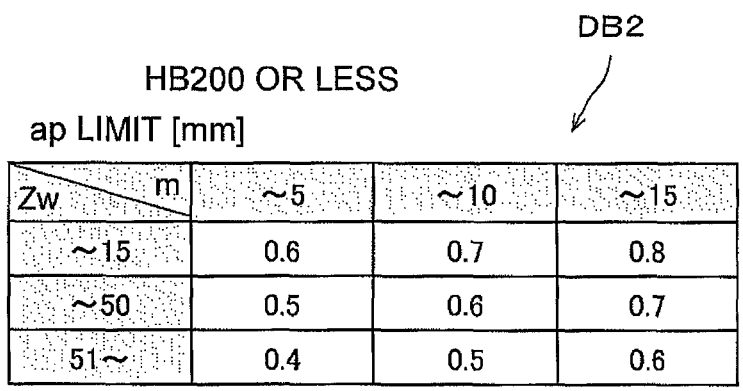
FIG. 4 is a table representing an exemplary cutting-in amount upper limit.

A second database DB2 is data of a cutting-in amount upper limit ap2 empirically defined based on the material of the gear workpiece 2, the module m and the number of gear teeth Zw of the gear workpiece 2. FIG. 4 represents an example of the second database DB2 containing the cutting-in amount upper limit ap2 where the gear workpiece 2 is made of a material with Brinell hardness (HB) of 200 or less. It should be noted that, when machining is executed at the cutting-in amount upper limit or greater, there are high chances of breakage, damage or abnormal abrasion in a cutting blade of the hob 1.

Third Database

According to the research conducted by the inventors of the present invention, the following was found regarding a relation between a phenomenon of the cutting edge of the hob 1 and a cutting condition.

In short, regarding the relation between a cutting edge phenomenon and a cutting condition, it was revealed that abrasion of the cutting edge is remarkably affected by heat generated in machining; loss of the cutting edge is remarkably affected by force; and minute chipping is remarkably affected by local stress. Further, heat is related to the cutting speed and the cutting-in amount, while loss and local stress are both related to the cutting-in amount.

Therefore, it is obviously important to inhibit heat i.e., a cutting edge temperature for inhibiting abrasion of the cutting edge. Further, as a result of analysis of the cutting edge temperature where gear teeth cutting is executed with a predetermined cutting-in amount at a predetermined cutting speed, it was revealed that a predetermined correlation is established between the cutting edge temperature and a value of "the cutting speed× the cutting-in amount". In this case, where the cutting edge temperature is constant, a relation is established between the cutting speed and the cutting-in amount that the cutting speed is asymptotic to an ap axis represented in FIG. 5 in proportion to increase in the cutting-in amount, while being asymptotic to a V axis in proportion to reduction in the cutting-in amount.

Figure 5:
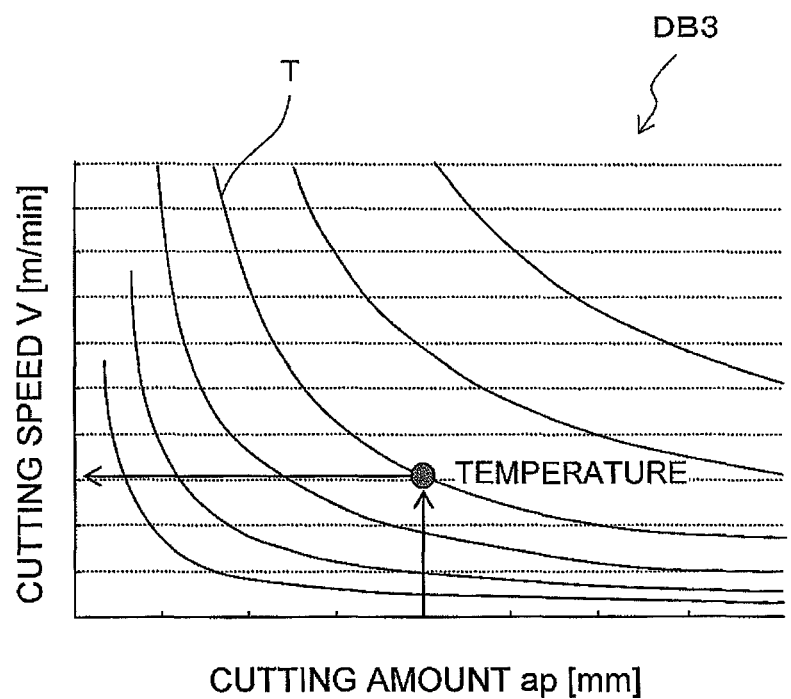
FIG. 5 is a chart representing a relation among a temperature constant curve, a cutting-in amount and a cutting speed.

Based on a result of the aforementioned research, as represented in FIG. 5, it is possible to obtain a relation between the cutting-in amount ap and the cutting speed v with respect to a given curve T where the cutting edge temperature is constant. The storage unit 11 stores such data as represented in FIG. 5 as a third database DB3.

Control Processing

Figure 6:
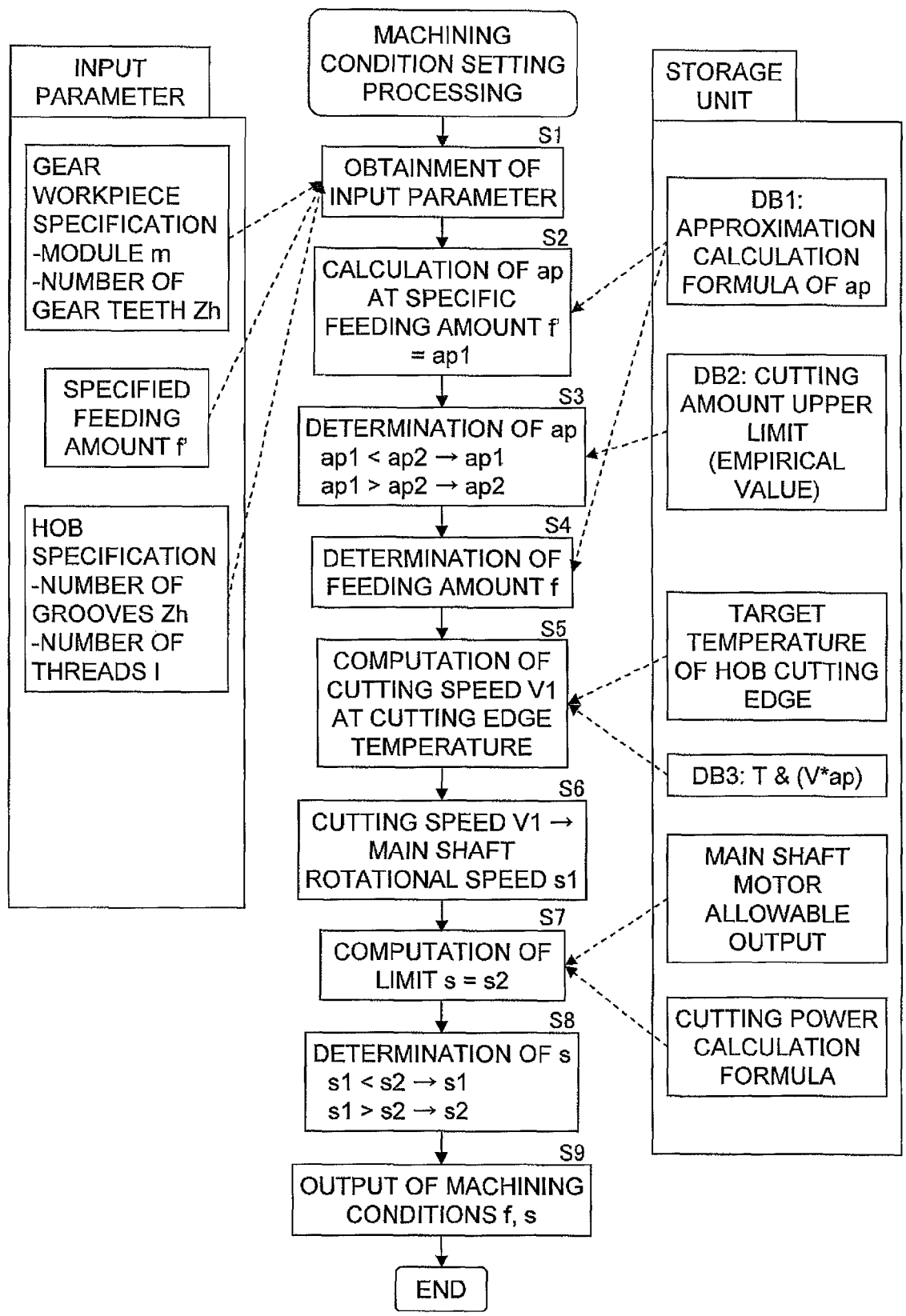
FIG. 6 is a control flowchart of a machining condition computing device.

FIG. 6 represents a flowchart for setting a machining condition. It should be noted that FIG. 6 represents input parameters on a left-side field of the flowchart, while representing parameters for a control purpose stored in the storage unit 11 and the contents of databases preliminarily stored in the storage unit 11 on a right-side field of the flowchart. Further, an input parameter and a database, which are used in each processing step, are represented in association with each other using a broken line.

First in Step S1, a variety of parameters inputted through the input unit 13 and parameters (specifications, etc.) inputted into the numerical control device 6 are received. Parameters to be imported to or retrieved by the computing unit 12 are as follows.

(a) Gear workpiece specification: the module m, the number of gear teeth Zw
(b) The specified feeding amount f'
(c) Hob specification: the number of grooves Zh, the number of threads I Here, the specified feeding amount f' is a value to be inputted by an operator through the input unit 13 in consideration of the finished surface roughness of the gear workpiece 2 and etc. In this case, the surface roughness refers to a theoretical surface roughness expressed by a value determined by the feeding amount and the outer diameter of the hob. It should be noted that the specified feeding amount f' may not be specified (inputted) because a designed target value of the surface roughness may beyond performance of the cutting edge of the hob.

Next in Step S2, the computed cutting-in amount ap1 is calculated based on the specified feeding amount f' using the first database DB1. Specifically, the following formulas are respectively used for calculating the computed cutting-in amount ap1 based on the specified feeding amount f', the specification of the hob and the specification of the gear workpiece.

Computed cutting-in amount: $ap1 = \beta \times q^{\gamma}$

Characteristic value: $q = m \times f' \times I^{\alpha}/(Zw \times Zh)$

In Step S3, the cutting-in amount ap is calculated based on the computed cutting-in amount ap1 obtained in Step S2 and a cutting-in amount upper limit ap2 of the second database DB2. Specifically, in Step S3, the computed cutting-in amount ap1 is set as the cutting-in amount ap when the computed cutting-in amount ap1 is less than the cutting-in amount upper limit ap2, whereas the cutting-in amount upper limit ap2 is set as the cutting-in amount ap when the computed cutting-in amount ap1 is greater than the cutting-in amount upper limit ap2. In other words, the smaller one of the two cutting-in amounts is set as the cutting-in amount ap. It should be noted that the cutting-in amount upper limit ap2 is set as the cutting-in amount ap when the specified feeding amount f' is not being specified.

Then in Step S4, the feeding amount f is calculated based on the cutting-in amount ap using an approximation formula and a characteristic value formula of the first database DB1. It should be noted that any of the two cutting-in amounts may be used when the two cutting-in amounts are the same.

Next in Step S5, a cutting speed V1 corresponding to the cutting-in amount ap is computed with reference to a target temperature T of the cutting edge of the hob 1 and the third database DB3, both of which are stored in the storage unit 11, using a curve of the target temperature T. Then in Step S6, the cutting speed V1 obtained in Step S5 is converted into a main shaft rotational speed s1 of the main shaft connected to the main shaft motor 5a.

In Step S7, on the other hand, a rotational speed upper limit s2 is calculated based on an allowable output of the main shaft motor 5a and a cutting power, both of which are stored in the storage unit 11. The cutting power is calculated based on the specifications of the hob and the gear workpiece, the main shaft rotational speed and the feeding amount Then in Step S8, a main shaft rotational speed s for a control purpose, corresponding to the cutting speed, is calculated based on the aforementioned rotational speed s1 and rotational speed upper limit s2. Specifically, the rotational speed s1 is set as the main shaft rotational speed s when the rotational speed s1 is less than the rotational speed upper limit s2, whereas the rotational speed upper limit s2 is set as the main shaft rotational speed s when the rotational speed s1 is greater than the rotational speed upper limit s2. In other words, the smaller one of the two rotational speeds is set as the main shaft rotational speed s for a control purpose. It should be noted that any of the two rotational speeds may be used when the two rotational speeds are the same.

Then in Step S9, the feeding amount f and the main shaft rotational speed s, calculated by the aforementioned processing, are transmitted to the numerical control device 6 and the processing is finished.

It should be noted that the numerical control device 6 determines a command current to be supplied to the main shaft motor 5a based on the main shaft rotational speed s sent thereto in consideration of a reduction ratio in a power path from the main shaft motor 5a to the main shaft and etc.

Features (1) A preferred feeding amount f and a preferred cutting speed V (main shaft rotational speed) can be easily obtained by inputting the specifications of the hob and the gear workpiece and the surface roughness. Therefore, preferred machining conditions can be easily and constantly obtained without executing a machining test even when the specifications of the hob and the gear workpiece are changed.

(2) To determine the feeding amount suitable for respective conditions, the cutting-in amount upper limit obtained as an empirical value is referred in addition to the computed cutting-in amount obtained based on the specified feeding amount calculated based on the specifications of the hob and the gear workpiece and the surface roughness. Therefore, machining conditions can be easily determined in consideration of the quality of machining and the life of the hob.

(3) The cutting speed is calculated based on the feeding amount so that the cutting edge temperature of the hob is set to be a target temperature. Therefore, abnormal abrasion of the hob can be prevented while machining can be executed under efficient conditions.

Other Exemplary Embodiments

The present invention is not limited to the aforementioned exemplary embodiment and a variety of changes or modifications can be herein made without departing from the scope of the present invention.

(a) To form an approximation formula of the cutting-in amount, the module m and the number of gear teeth Zw of the gear workpiece, the specified feeding amount f, the number of grooves Zh and the number of threads I of the hob are set as parameters. However, the approximation formula may be formed with additional use of a parameter other than the above parameters.

(b) The machining condition computing device is provided separately from the numerical control device of the hobber. However, the machining condition computing device may be embedded in the numeric control device.

With the device of the illustrated embodiments, it is possible to easily obtain a preferred feeding amount and a preferred cutting speed by inputting a specification of a hob, a specification of a gear workpiece and etc., and thereby, it is possible to execute efficient machining based on appropriate machining conditions.

The invention claimed is:

1. A gear machining condition setting device for outputting a machining condition in cutting a gear workpiece using a hob, the gear machining condition setting device comprising:
a parameter receiving unit configured to receive
a feeding amount determining parameter containing a specification of the hob and a specification of the gear workpiece, and
a target temperature of a cutting edge of the hob during machining;
a first storage unit configured to store a cutting-in amount calculation formula representing a relation between a computed cutting-in amount per a cutting blade of the hob and a characteristic value determined by the feeding amount determining parameter and a relative feeding amount of the hob with respect to the gear workpiece;
a second storage unit configured to store a cutting-in amount upper limit per the cutting blade of the hob preliminarily set by the specification and a material of the gear workpiece;
a feeding amount computing unit configured to compute a feeding amount of the hob using the cutting-in amount calculation formula based on a selected cutting-in amount, the selected cutting-in amount being selected as one of the computed cutting-in amount obtained from the cutting-in amount calculation formula and the cutting-in amount upper limit;
a third storage unit configured to store data of a constant temperature curve representing a relation between the cutting-in amount and a cutting speed where the temperature of the cutting edge of the hob is set to be a predetermined temperature; and
a cutting speed computing unit configured to compute the cutting speed corresponding to the selected cutting-in amount by referring to a curve of the target temperature of the cutting edge of the hob in the constant temperature curve,
the gear machining condition setting device being configured to output a signal indicating the computed feeding amount and cutting speed to a numerical control device that is arranged and configured to control a gear machining device having the hob.

2. The gear machining condition setting device recited in claim 1, wherein
the feeding amount determining parameter contains a relative specified feeding amount of the hob with respect to the gear workpiece, and
the feeding amount computing unit is configured to compute the feeding amount based on a cutting-in amount obtained with reference to the cutting-in amount upper limit and the computed cutting-in amount obtained using the cutting-in amount calculation formula based on the specified feeding amount.

3. The gear machining condition setting device recited in claim 2, wherein
the feeding amount computing unit is configured to select a smaller one of the computed cutting-in amount and the cutting-in amount upper limit as the cutting-in amount.

4. The gear machining condition setting device recited in claim 1, wherein
the characteristic value contained in the cutting-in amount calculation formula is a value that is proportional to a module of the gear workpiece, the feeding amount of the hob with respect to the gear workpiece and a power of a number of threads of the hob, and is inversely proportional to a number of gear teeth of the gear workpiece and a number of grooves of the hob.

5. The gear machining condition setting device recited in claim 1, wherein
the constant temperature curve is generated based on a relation that the cutting-in amount and the cutting speed are inversely proportional where the temperature of the cutting edge of the hob is constant.

6. The gear machining condition setting device recited in claim 1, wherein
the cutting speed computing unit is configured to compute a main shaft rotational speed based on the cutting speed.

7. The gear machining condition setting device recited in claim 6, further comprising:
a fourth storage unit configured to store an allowable output of a main shaft motor; and
a main shaft rotational speed limit computing unit configured to compute a main shaft rotational speed upper limit based on the allowable output and a cutting power computed based on the specifications of the hob and the gear workpiece, the main shaft rotational speed and the feeding amount of the hob with respect to the gear workpiece,
wherein the cutting speed computing unit is configured to compare the main shaft rotational speed upper limit and the main shaft rotational speed obtained by the computation and output a smaller one of the main shaft rotational speed upper limit and the main shaft rotational speed as a main shaft rotational speed for a control purpose.

8. A gear machining device for cutting gear teeth with an involute curve, the gear machining device comprising:
a main shaft with a hob being attached to a tip thereof;
a feeding unit configured and arranged to move the main shaft along an axial direction of a gear workpiece;
a numerical control unit configured to set a processing condition including a feeding amount of the feeding unit and a rotational speed of the main shaft and control machining; and a gear machining condition setting device configured to transmit a set value of the feeding amount and a set value of the main shaft rotational speed to the numerical control unit,
the gear machining condition setting device comprising:
a parameter receiving unit configured to receive
- a feeding amount determining parameter containing a specification of the hob and a specification of the gear workpiece, and
- a target temperature of a cutting edge of the hob during machining;

a first storage unit configured to store a cutting-in amount calculation formula representing a relation between a computed cutting-in amount per a cutting blade of the hob and a characteristic value determined by the feeding amount determining parameter and a relative feeding amount of the hob with respect to the gear workpiece;

a second storage unit configured to store a cutting-in amount upper limit per the cutting blade of the hob preliminarily set by the specification and a material of the gear workpiece;

a feeding amount computing unit configured to compute a feeding amount of the hob using the cutting-in amount calculation formula based on a selected cutting-in amount, the selected cutting-in amount being selected as one of the computed cutting-in amount obtained from the cutting-in amount calculation formula and the cutting-in amount upper limit;

a third storage unit configured to store data of a constant temperature curve representing a relation between the cutting-in amount and a cutting speed where the temperature of the cutting edge of the hob is set to be a predetermined temperature; and a cutting speed computing unit configured to compute the cutting speed corresponding to the selected cutting-in amount by referring to a curve of the target temperature of the cutting edge of the hob in the constant temperature curve.

* * * * *